Patented June 28, 1927.

1,633,959

UNITED STATES PATENT OFFICE.

EDUARD SMOLCZYK, OF BIESDORF-SUD, NEAR BERLIN, GERMANY.

METHOD FOR IMPARTING TO DRYING MEANS A LARGE SUPERFICIAL AREA.

No Drawing. Application filed June 3, 1926, Serial No. 113,588, and in Germany June 8, 1925.

As experience has shown drying agents will act the more intensively the larger the area of the surface offered to the substance to be dried. A means for obtaining such large surface consists in depositing the drying agent upon a carrier having large superficial areas, as for instance pumice, glass wool and so on. In many instances this way of treatment did not prove practicable since the drying agent did not stick to the carrier employed.

According to the invention adhesion is obtained in this instance in that a small portion of the drying agent is transferred to its hydrate and that the carrier employed is impregnated at first with such hydrate and then brought into contact with the unchanged drying agent. In this manner it is possible to deposit for instance pentoxide of phosphorus upon pumice, to which it will not adhere otherwise, by impregnating the pumice in an appropriate manner with meta-phosphoric acid, and then the whole mass is agitated in an excess of pentoxide of phosphorus until all the pentoxide of phosphorus will stick to the previously treated grains of pumice. It has been found, that it will suffice to deposit about one fifth of the quantity of pentoxide of phosphorus used in the form of meta-phosphoric acid in order to obtain adhesion of the remaining four fifths thereof. During the operation meta-phosphoric acid will be formed from the pentoxide of phosphorus, which acid will penetrate into the interior of the grains of pumice, causing the surface of the grains to become free for reception of additional quantities of pentoxide of phosphorus. Thus the granular material employed can be impregnated repeatedly with drying agents.

A further advantage in employing drying agents of the kind referred to above is to be seen in the fact, that while the drying agent per se on account of its physical properties could only flow over the substance to be dried, it is now possible to fill it in drying towers and the like and cause a gas to be dried, to flow through the column, admitting of a more intensive and rapid drying operation.

I claim:

Method for imparting to drying means a large superficial area comprising depositing said means upon a porous carrier, and employing as binder between the carrier and the drying agent a hydrate of the latter.

In testimony whereof I affix my signature.

DR. PHIL. EDUARD SMOLCZYK.